United States Patent [19]

Meyer

[11] Patent Number: 4,475,723

[45] Date of Patent: Oct. 9, 1984

[54] ELONGATED SPRING MEMBER

[75] Inventor: Leonard S. Meyer, Columbia, S.C.

[73] Assignee: Kidde Recreation Products, Inc., North Brook, Ill.

[21] Appl. No.: 372,537

[22] Filed: Apr. 28, 1982

[51] Int. Cl.³ .............................................. F16F 1/18
[52] U.S. Cl. .................................. 267/47; 267/54 R; 267/149
[58] Field of Search ............... 188/268; 267/47, 54 R, 267/54 B, 54 E, 148, 149

[56] References Cited

U.S. PATENT DOCUMENTS

| | | | |
|---|---|---|---|
| 3,142,598 | 7/1964 | Rosen | 267/47 X |
| 3,172,650 | 3/1965 | Jarret et al. | 188/268 X |
| 3,586,307 | 6/1971 | Brownyer | 267/47 |
| 3,645,522 | 2/1972 | Rowland | 267/54 R |
| 3,841,655 | 10/1974 | Schaeff | 267/54 R X |
| 3,945,625 | 3/1976 | Duchemin | 267/54 R X |

*Primary Examiner*—Duane A. Reger

*Attorney, Agent, or Firm*—Emory L. Groff, Jr.

[57] ABSTRACT

An elongated spring member is formed of fiber reinforced plastics, particularly resin-impregnated glass fiber strands, and includes end provisions adjacent the two ends for the reception of attachment elements associated with the use of the spring. The spring includes parallel impregnated strands which have been wound about a rack provided with end supports following which the entire wound resinous product is placed within a mold cavity and cured to provide a spring member having integral, molded end provisions encircled by continuous, uncut reinforcing fibers with or without the inclusion of additional reinforcing material, and which is molded without the formation of any significant waste product. The improved spring member includes transversely disposed end provisions which may comprise a passageway or elongated end members encircled by the reinforced strands and the center axis thereof may be along the neutral axis of the spring body or alternatively, above or below the neutral axis.

9 Claims, 21 Drawing Figures

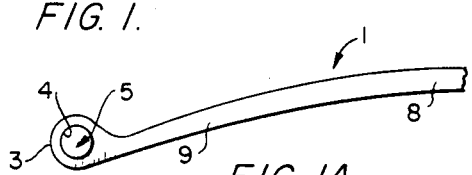
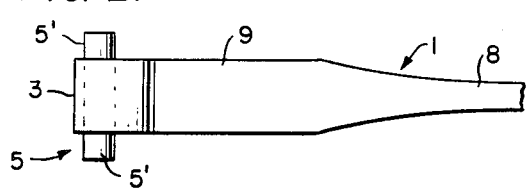
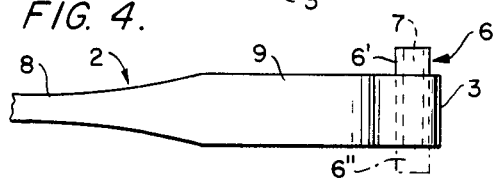
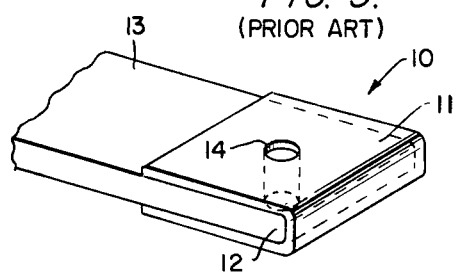
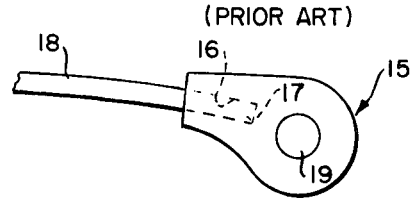
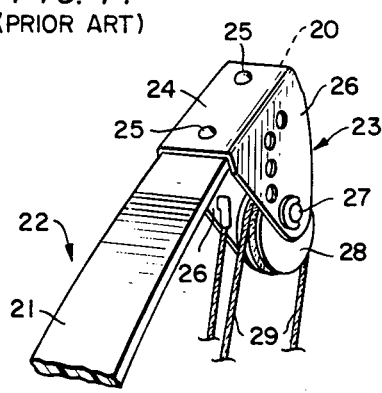
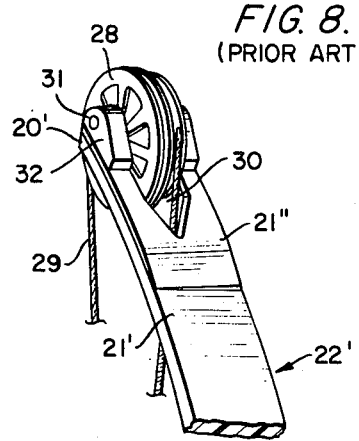
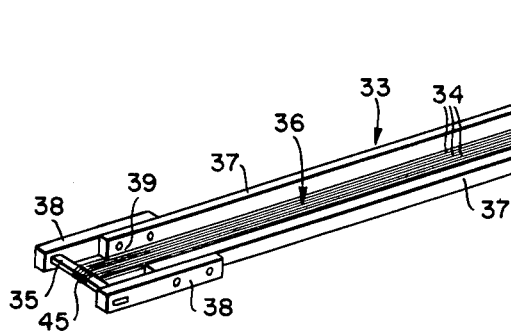

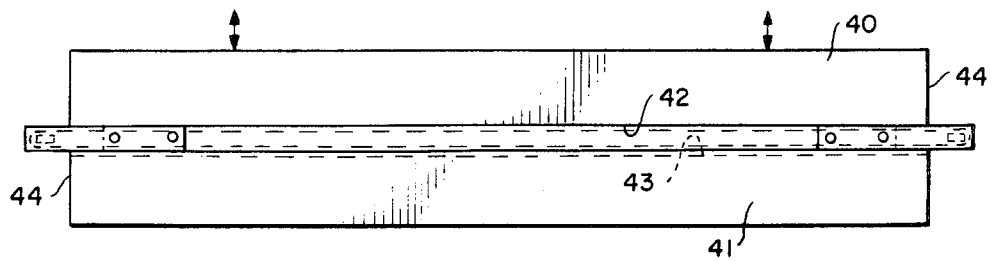
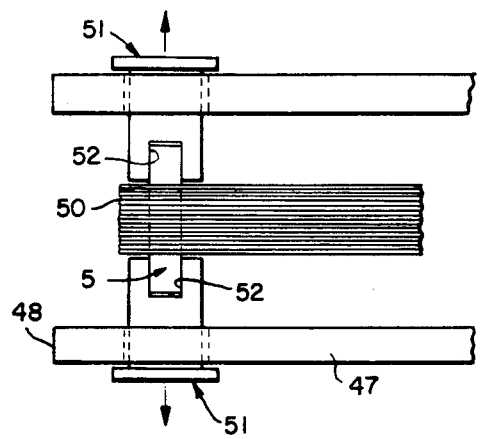
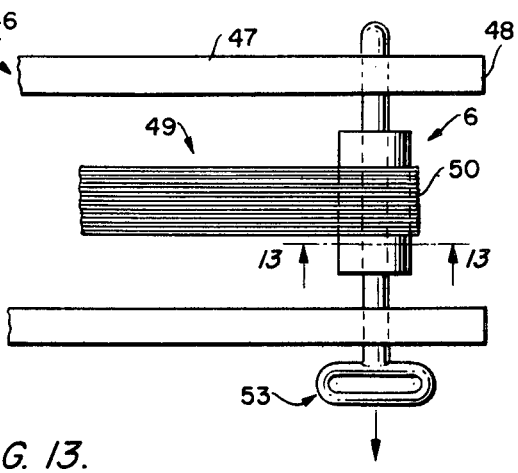
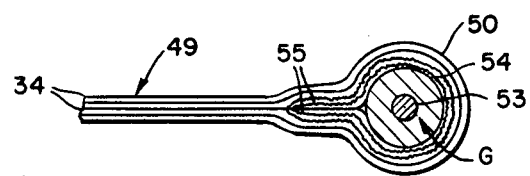
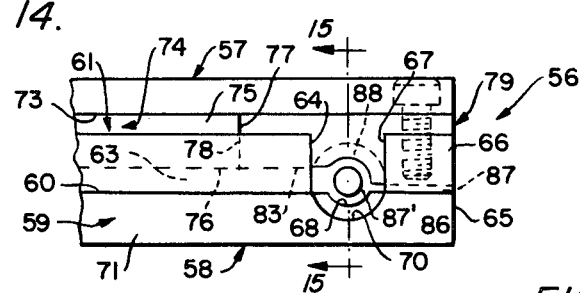
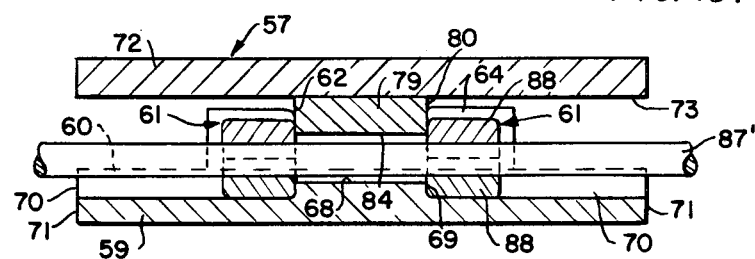

ELONGATED SPRING MEMBER

This invention relates generally to spring members formed of reinforced synthetic resinous products particularly, resin-impregnated glass fiber strands. The spring member preferably comprises a single leaf member formed of a plurality of longitudinally extending resin-impregnated strands of reinforcement and wherein these strands for the most part are continuous or uninterrupted, not only throughout the longitudinal extent of the spring body but most importantly, around the two ends thereof. Certain embodiments of the spring may include additional reinforcing material in the area of the spring ends.

Elongated spring members formed of fiber reinforced plastics are highly desirable for industrial and recreational use such as for vehicular leaf springs, vibrating conveyor springs and archery bows. Two principal advantages associated with the use of reinforced plastics in these areas include a much higher strength-to-weight ratio than obtainable with metal industrial springs and either metal or wooden archery bows. Additionally, there exists a greater flexibility of design and a more improved ease of manufacture when producing an elongated spring member of fiber reinforced plastics.

Until the present invention, two problems have confronted manufacturers of laminated or composite spring members. First, there has been difficulty in providing reliable attachment means or end provisions adjacent the tips or end portions of the springs. Such end provision is necessary, in the case of vehicle springs for example, to allow attachment of the flexing end portions of the spring to the vehicle chassis. Suitable end provisions are likewise necessary in many other industrial spring applications. Attachment means such as pivotal links may be readily fastened to the ends of a metal spring without compromising the performance or the reliability of the spring but an entirely different situation is present when the spring comprises a conventionally produced fiber reinforced plastics member such as disclosed in U.S. Pat. No. 3,530,312 issued to Kienle et al on Sept. 22, 1970.

In the above prior art example, an elongated spring member is formed of a plurality of parallel, longitudinally extending strands each comprising resin-impregnated reinforcing rovings or fibers which are molded and cured between reciprocating mold sections with the resin being provided in either a liquid or pre-preg state. The end product comprises a member wherein the two ends thereof exhibit cut-off portions with the reinforcing filaments of each strand presenting a severed or raw edge. Such a construction readily lends itself to fatigue failure when certain associated attachment means are joined to the end portions of the spring, with this failure often exhibiting itself as a longitudinal splitting or delamination of the spring terminal portions extending through the area of the attachment provisions.

Prior efforts in attacking this problem have included providing a cladded tip of disparate material about the spring ends or adding on to the spring ends a substantially enlarged tip attachment element which itself provides the end provision for the spring. These two solutions have been found to be less than satisfactory and introduce the further problem of insuring a fixed connection of the disparate member to the spring tip, a connection which can be difficult to maintain in view of the stresses occuring between the attachment element and the spring tip. Furthermore, use of an added-on attachment element does not change the fact that the adjacent spring tip still comprises cutoff ends of resin-impregnated strands which is contrary to the improvement advanced by the present invention.

The spring member of this invention not only addresses the above discussed problem but also overcomes a second, very important economic problem, namely reduction of the amount of wasted starting material by providing a spring member of the type described and having self-contained end attachment provisions. This spring member is produced in a molding apparatus intended to incorporate all of the fully continuous, impregnated rovings into the finished spring product substantially without any severing of these rovings as a waste product.

In my earlier U.S. Pat No. 2,980,158 issued on Apr. 18, 1961, a spring member is formed by winding a continuous strand of resin-impregnated fiber reinforcing roving about a frame or rack with the wound bundle then being subjected to heat and pressure between a pair of reciprocating mold sections to mold and cure the spring member or archery bow. With such an arrangement, the opposite ends of the rack supporting the stretched or wound bundle of impregnated strands are disposed beyond two ends of the mold sections in order to clear the mold, as it is closed. After the molding and curing operation, all of the stock material extending beyond each end of the mold cavity and then around the ends of the rack is trimmed off as waste.

The above procedure not only results in destroying the full continuity of the fiber strands and leaves cut strand ends similar to the spring member as produced according to the above mentioned Kienle et al patent, but also contributes to a highly wasteful operation. Until this time, hundreds of thousands of spring members have been manufactured following the teaching of my above prior patent and on the average, the trimmed waste material amounts to approximately 1/10 the total amount of material required to produce each spring. This waste is, of course, not re-usable and thus a substantial financial gain is to be realized by its elimination pursuant to the present invention.

As now proposed, a spring member is offered which comprises a body formed of a plurality of longitudinally extending resin-impregnated strands which are fully continuous that is, from one end of the spring member to the opposite end and returning to the first end, etc and wherein either transverse and/or vertical provisions are formed within the end portions of the spring member during its manufacture with these end provisions subsequently serving to accommodate any suitable components associated with the intended use of the spring member. A suitable molding and curing apparatus for carrying out the method of producing the instant spring member may include, either fixed or replaceable components on male and female mold section and which are adapted to cooperate with a rack or frame which has been wound with a fiber reinforced plastics product. Unlike previously used apparatus, the structure employed to form the present spring fully contains the entire longitudinal extend of the wound product within the confines of the cavity defined by the two mold sections such that the strands of the impregnated roving passing around the ends of the rack are molded and cured along with the balance of the material.

Accordingly, one of the objects of the present invention is to provide an improved elongated spring member having strands of fiber reinforced plastics extending substantially continuously not only throughout the medial extent of the spring but also around the end portions thereof and wherein these end portions include provisions for the reception of attachment members and which are formed during the molding of the spring member.

Another object of the present invention is to provide an improved elongated spring member formed of wound strands of fiber reinforced plastics with end provisions comprising transversely extending members encircled by the wound strands.

Still another object of the present invention is to provide an elongated spring member formed of wound strands of fiber reinforced plastics with end provisions comprising transversely extending members having their center axes disposed along the neutral axis of the body of the spring member or alternately above or below this neutral axis.

Another object of the present invention is to provide an improved elongated spring member formed of wound strands of fiber reinforced plastics with end provisions comprising transversely extending members with the strands extending in a continuous loop fashion and providing a constant cross-sectional area substantially throughout the spring length with the end provisions presenting a substantially greater height.

A further object of the present invention is to provide an improved elongated spring member comprising a single leaf having a thick and narrow medial section bounded by opposite thinner and wider terminal portions in turn including vertically enlarged tips and wherein the mass of material contained within the area of any transverse plane through the spring is substantially equal throughout the length of the spring member.

With these and other objects in view which will more readily appear as the nature of the invention is better understood, the invention consists in the novel construction, combination and arrangement of parts hereinafter more fully illustrated and claimed.

FIGS. 1 and 2 are fragmentary side elevation and top plan views of an improved spring member according to the present invention;

FIGS. 3 and 4 are fragmentary side elevation and top plan views of a modified form of the present spring member;

FIGS. 1A and 3A are fragmentary side elevation views of modified spring end portions;

FIG. 5 is a fragmentary end perspective of a spring member tip according to the prior art;

FIG. 6 is a fragmentary side elevation of an alternate spring tip according to the prior art;

FIGS. 7 and 8 are perspective views of end provisions for accommodating attachment members on the tips of archery bows;

FIG. 9 is a top perspective view of a wind-up frame or rack as employed to produce elongated spring members according to the prior art;

FIG. 10 is a side elevation of a typical mold apparatus employing the rack assembly of FIG. 9;

FIGS. 11 and 12 are fragmentary top plan views of an improved wind-up frame or rack as employed to produce the present invention;

FIG. 13 is a vertical transverse view taken along the line 13—13 of FIG. 12;

FIG. 14 is a fragmentary side elevation of a mold apparatus as may be used to produce the present invention;

FIG. 15 is a transverse sectional view along the line 15—15 of FIG. 14;

Similar reference characters designate corresponding parts throughout the several figures of the drawings.

Figure 16:
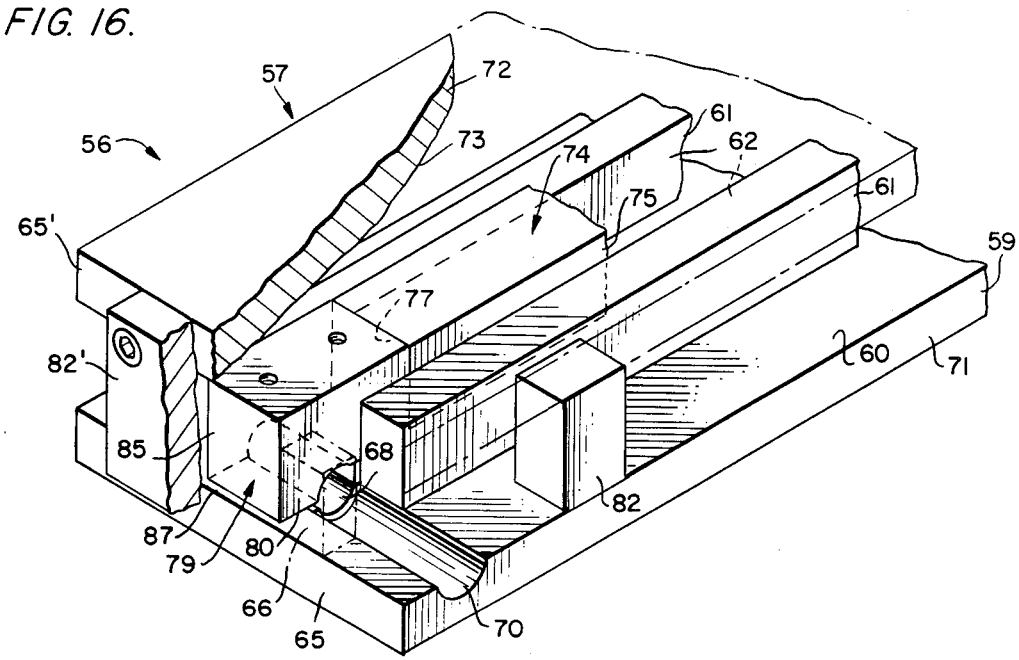
FIG. 16 is a fragmentary top perspective view partly in section, of the mold apparatus as it appears when in the closed position.
Figure 17:
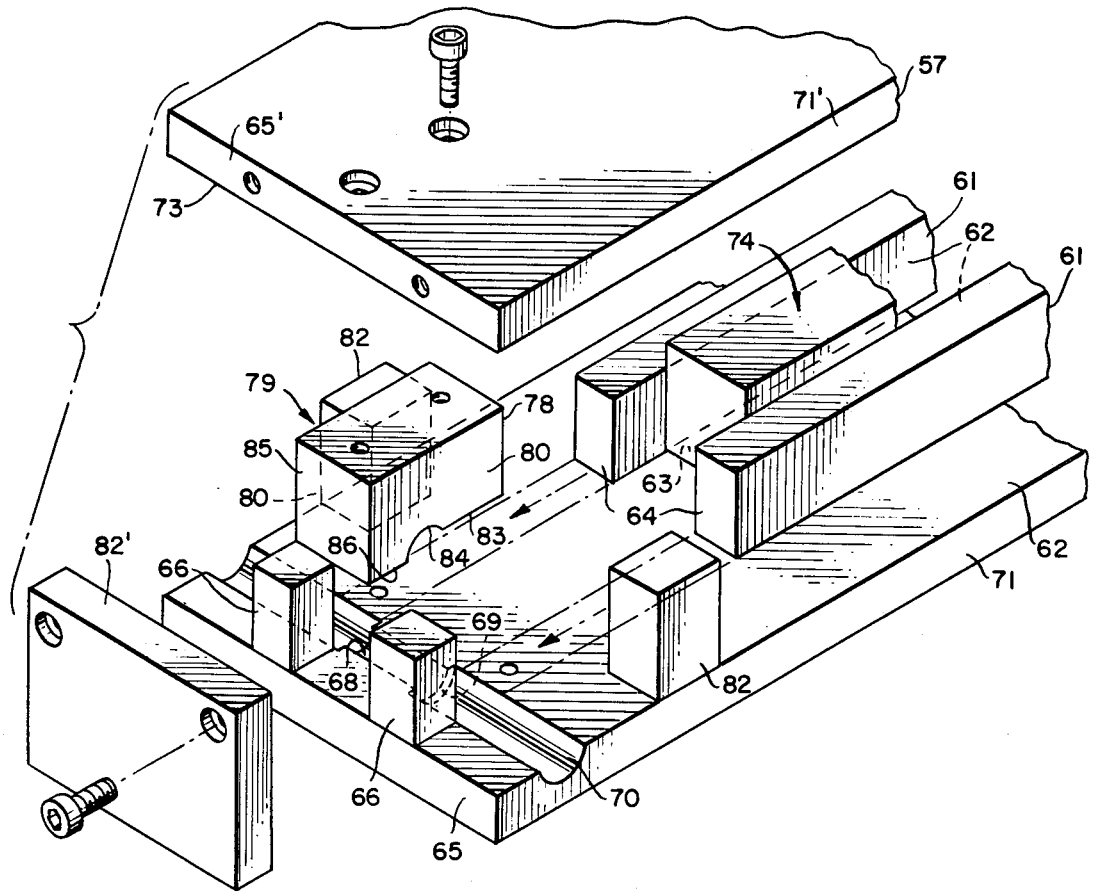
FIG. 17 is an exploded view of the structure of the mold apparatus of FIG. 16.
Figure 18:
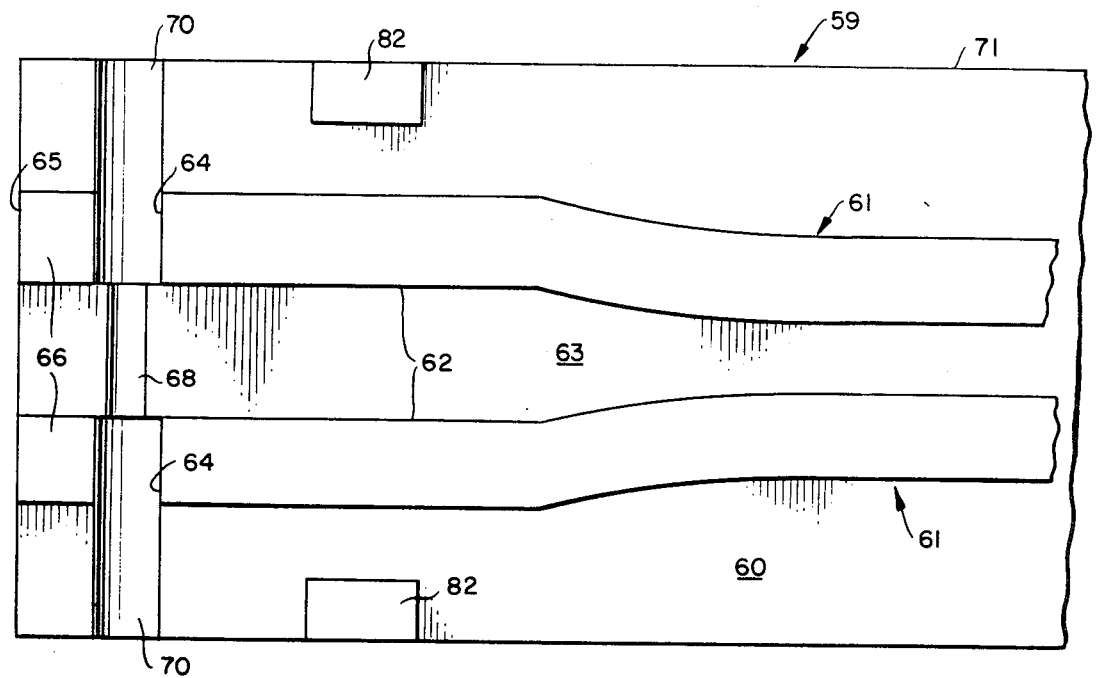
FIG. 18 is a horizontal sectional view through the mold apparatus of FIG. 16 taken immediately beneath the top plate of the upper mold section.

Referring now to the drawings, particularly Figs. 1–4, the present invention will be understood to relate to improved elongated spring members of the leaf type and which may comprise relatively long and narrow members normally disposed in a planar manner or bowed such as depicted in FIGS. 1 and 3. Additionally, it will be understood that the opposite ends of any one spring may be similar or dissimilar. The difference between the embodiments of the spring member 1 shown in FIGS. 1, 1A and 2 and the spring member 2 as illustrated in FIGS. 3, 3A and 4 resides in the particular attachment means or end provision as formed adjacent the tip 3 of each spring member. This end provision concerns the formations provided adjacent the tips 3 for the reception or mounting of fastening or attaching means employed in the utilization of the spring member. In both of the spring embodiments 1 and 2, this provision is formed by providing a transverse bore 4 through each end of the spring member and which will be seen to cooperate with either a solid rod or pin 5 as in FIGS. 1, 1A and 2, or a tubular pin or sleeve 6 as illustrated in the embodiment of FIGS. 3, 3A and 4. Alternatively, the bore 6 itself may serve as the end provision, depending upon the environment within which the spring member is to be used.

The present concept may be carried out by presenting end provisions having their axes disposed at various points relative the neutral axis of the spring body. In the case of the spring members shown in FIGS. 1 and 3, the end provisions will be seen to be located above the neutral axis of the spring members 1 and 2. Alternatively, these end provisions may be located along the neutral axis as in the spring member 1' of FIG. 1A or below the neutral axis as depicted in the spring member 2' of FIG. 3A.

The arrangement as shown with the spring member 1 may be used, for example, when employing the spring in a vehicle and serves as means for attaching any suitable linkage (not shown) as is well known in the attachment of vehicle leaf spring ends to a vehicle chassis. In such a case, the laterally projecting portions 5' of the rod 5 serve as pivot points engaged by linkage to support the ends of the springs during the normal flexing thereof.

The alternative end provisions shown in FIGS. 3–4 may include two lateral projections 6' on the tubular sleeve 6 or on the other hand, these projections may be cut off or omitted as reflected by the broken line 6". In either case, a bore 7 is provided which serves as appropriate journal means for the reception of any suitable attachment structure. This attachment structure may again comprise appropriate pivotal linkage means for a vehicle spring or alternatively, in the case of an archery bow, means for supporting a pulley axle as in a compound archery bow. The spring members 1 and 2 are shown provided with medial sections 8 defining a thickened height and a reduced width with each medial section 8 bounded by terminal portions 9—9 which will be seen to comprise a thinner thickness than that of the medial section but are formed with an increased width relative the adjacent medial section 8. The vertical height or overall thickness of the tip 3 of each spring member 1,2 is substantially greater than that of the adjacent terminal portion 9 and the reasons for the above described relative dimensions of the various areas of the spring members will become obvious later on in the following description.

Prior attempts at producing elongated spring members from fiber reinforced plastics formed by molding wound resin-impregnated glass fiber rovings have resulted in springs of a substantially constant thickness throughout their length and which have exhibited numberous shortcomings in view of the difficulty in forming suitable end provisions for the connection of appropriate attachment means thereto. One problem has been the tendency of the tips of the spring to split or de-laminate due to stresses imparted by the attachment means. This problem has been aggravated due to the formation of the cut or severed reinforcing strands at the distal portion of the spring tips. FIG. 5 illustrates an earlier attempt to alleviate this problem and shows a cladded spring tip 10 comprising an overlying reinforcing element 11 whithin which each tip 12 of a spring member 13 is sandwiched. The end provision comprises a vertical opening 14 extending through both the spring tip 12 and the opposite portions of the reinforcing element 11 and which serves to receive an appropriate link member, bolt or other fastening device associated with the spring member 13. The cladded spring tip 10 certainly assists in discouraging a breakdown of the fiber reinforced plastics spring tip 12 but still does not provide the reliability which will be understood to exist with the arrangement as proposed by this invention.

Another earlier attempt at alleviating the problem of providing an end provision for a spring member is shown in FIG. 6 and comprises a tip attachment element 15 formed of an enlarged body of suitable molded material such as plastics and which includes a cavity 16 within which the tip 17 of the spring member 18 is closely fitted and retained by means of an appropriate adhesive. A transverse bore 19 in the attachment element 15 offers the end provision for the reception of appropriate related attachment means. It is true that this latter attempt isolates the stress from a particular point on the spring tip 17 and thus avoids an objection with the assembly of FIG. 5 but nevertheless, the added mass presented by the attachment element 15 and the possible problems insuring its permanent rigid attachment to the spring tip 17 negate its value.

FIGS. 7 and 8 illustrate existing methods of offering end provisions adjacent the tips 20, 20' of the limbs 21, 21' of two embodiments of archery bows 22, 22'. In the case of the fiber reinforced plastics bow limb 21, a bracket 23 of disparate material includes a base 24 flushly disposed thereto by mechanical fasteners 25, 25 such as rivets. A pair of laterally spaced apart bracket side plates 26—26 serve to support a transverse axle 27 upon which is mounted a cam element or wheel 28 about which the bowstring or cable 29 is sheaved in a manner well known to those familiar with compound bows. This prior arrangement for providing an end provision for the mounting of the wheels 28 has been widely used for several years but is not considered by some archers to be the most desirable type of installation. Quite obviously, any method which would avoid the disposition of the mechanical fasteners 25 through the vertical thickness of the bow limbs 21 would be welcomed. Additionally, the very weight of the bracket 23 and the location of the wheel 28 a substantial distance from the limb itself detracts from one of the objectives of any bow maker, namely the reduction of weight in the area of the bow limb tips 20.

The configuration shown in FIG. 8 of the drawings comprises currently employed assembly which has been quite popular and which substantially reduces the mass carried by the tip 20' of each limb 21' of the bow 22'. Instead of a relatively bulky, disparate bracket, each limb tip is cut out as at 30 along its longitudinal axis to provide a clear area within which the pulley or wheel 28 may be disposed. This provides suitable means for accommodating the pulley axle 31. The stock of the bow limb 21' is built up by means of appropriate mounting blocks 32—32 and to discourage a fracture or longitudinal splitting of the bow limbs, a reinforcing plate comprising a laminar member 21 is attached in an overlying manner upon the surface of the limb and extends to its tip 20'. This latter construction is acknowledged to substantially reduce the mass carried by the bow limbs adjacent their tips but quite obviously, entails considerable costly steps leading to its manufacture in view of the plurality of components required and which must be separately produced and subsequently assembled.

Existing elongated spring members as discussed hereinabove are often manufactured by means of an appropriate frame or rack 33 such as shown in FIG. 9 and which is discussed in detail in my earlier referenced U.S. Pat. No. 2,980,158. This rack 33 serves as a frame upon which one or more continuous resin-impregnated strands 34 are wound about two spaced apart transverse end supports 35—35 to produce a fiber reinforced plastics body 36 comprising two levels or layers each including a plurality of adjacent, parallel portions of the strands 34. The end supports 35 of the rack are maintained in their spaced condition by means of two side members 37 which may include distal pivotal parallel side arms 38 respectively pivotally attached to each end of each side member by means of a pivot 39.

With a wound fiber reinforced plastics body 36 on such a rack 33, it is introduced between the spaced apart upper mold section 40 and lower mold section 41 as depicted in FIG. 10 of the drawings. The opposed working surfaces of the two mold sections 40 and 41 are configured to produce a cavity according to the configuration of the desired spring member to be produced such that when the mold sections are closed as in FIG. 10, the lower surface 42 of the male mold portion of the upper section is spaced from the bottom surface 43 of the female mold cavity of the lower section. The important point to realize when considering the production of an elongated spring member by the method shown in FIGS. 9 and 10 is that when the wound rack 33 is positioned between the upper and lower mold sections 40-41, the transverse end supports 35 of the rack are located well beyond the mold end walls 44 to insure that the upper and lower layers of the strands 34 on the rack 33 will not be impeded during the closing of the mold sections in order that a homogeneous or void-free mass will be molded and subsequently cured within the mold assembly without undue strain being placed upon the individual strands 34 or the end supports 35 of the rack. With such a procedure, it will be understood that all of the upper layer of stock material from each end 44 of the mold sections together with the end portions 45 wrapped around the transverse end supports 35, as well as that portion of the lower layer of material beneath each end support and beyond the end walls 44 does not become a part of the finished product and thus is thereafter trimmed off as waste. The method and apparatus of the present invention are intended to circumvent this waste of starting material and to produce an improved elongated spring member having integral end provisions formed during the molding and curing of the member.

FIGS. 11 and 12 illustrate a wind-up frame or rack 46 with alternate means for producing, during the molding operation, end provisions adjacent the ends of an elongated spring member. In each instance, the rack 46 includes a pair of laterally spaced apart side members 47—47 and optionally may include transverse support means (not shown) joining the opposite ends 48 thereof adjacent their distal portions. An important distinction with the arrangement of the present invention is that the entire extent of the wound fiber reinforced plastics body 49, including the two end portions 50 thereof, will be molded and cured within the confines of the cavity of the improved mold to be described hereinafter. The body 49 of the starting material still comprises a single or a plurality of continuous resin-impregnated strands 34 disposed in parallel relationship to one another and which encircle the rack 46 to provide the curved end portions 50—50 joining upper and lower layers of the body 49.

The end provisions for allowing attachment of the completed spring member to associated structure are formed by members included with the rack during the molding and curing and which may comprise for example, the solid rod or pin 5 of FIG. 11 or the tubular pin or sleeve 6 as in FIG. 12. It is around these members 5 or 6 that the strands 34 are wound and accordingly, suitable means are provided to support the pins or sleeves in a fixed transverse manner between the spaced apart rack side members 47. In the case of the pin 5 of FIG. 11, removable end retaining means 51 each include a socket 52 which snugly engages the lateral projecting portions 5' of the pin while in the case of the tubular sleeve 6 of FIG. 12, a removable key 53 is transversely insertable through the bore 7 of the sleeve to retain the sleeve both during the winding of the body 49 and subsequently, during the molding and curing operation as will become obvious hereinafter.

The resultant end provisions may comprise a solid pin 5 or tubular sleeve 6 themselves and which in turn are supported by or engaged by appropriate structure associated with the particular use of the spring member. In the case of vehicle springs for example, appropriate links may be attached to the two lateral projections 5' of the pin 5 on the one hand, or a transverse pivotal element may be inserted through the sleeve 6 on the other hand. In the case of an archery bow, wherein it is desired to support a wheel or pulley adjacent the end portion 50, the completed spring member may be provided with a longitudinal cut-out as in the case of the bow shown in FIG. 19 of the drawings. In this latter instance, the projecting portions 6' of the sleeve 6 may be eliminated as in the lower portion of FIG. 4. Other alternatives include treating the transverse pin or sleeve with a suitable parting compound so that following the molding and curing operation, the pin or sleeve may be easily removed wherein the resulting transverse bore provides a bow 22" with an end provision for receiving any appropriate axle or pivotal attachment means such as th axle 30'.

Particular spring members may comprise the addition of reinforcement means in the area of the end provision. One such example may be in the case of an archery bow limb tip which is provided with a medial cut-out portion and wherein additional reinforcement is included to overcome any possible loss of strength due to the provision of the cut-out but obviously any spring member may be provided with additional reinforcement. Accordingly, as shown in FIG. 13, a separate layer of fabric 54 initially may be wrapped around the pin or sleeve 6 with its two terminal portions 55—55 juxtaposed one another along the horizontal center plane or neutral axis of the assembly whereafter the strands 34 of the resin-impregnated reinforcement are subsequently wound about this fabric layer 54.

The material of the layer 54 is optional but preferably comprises glass fibers with the fabric being either woven or non-woven. This fabric layer is then employed in any one of several conditions such as, as pre-preg mat in a dry or tacky condition, pre-impregnated in the wet condition, or as a dry fabric layer. In the latter instance the reinforcing material of the layer would then depend upon the always present excess of resin in the main wind-up body 49 to impregnate the layer 54 during the molding and curing operation.

FIGS. 14–18 illustrate a molding and curing apparatus capable of producing this invention and which is generally designated 56. This apparatus includes an upper mold section 57 and an opposed lower mold section 58 and will be understood to include suitable means (not shown) operable to vertically displace the two mold sections relative one another such that when spaced apart, a wound frame or rack 46 may be inserted into the cavity of the lower mold section 58 and subsequently, the molded and cured spring member may be removed. When the two mold sections are closed, the cooperating components thereof define a specifically configured cavity within which the fiber reinforced plastics body 49 is compressed, molded and cured. The lower, or female mold section 58 includes a base plate 59 having a top surface 60 representing both a longitudinal and lateral dimension which is greater than the corresponding dimensions of the spring member which is to be produced thereby. This top surface may be planar throughout its extent, curved or other-wise shaped according to the configuration of the subject spring member.

A pair of side bars 61—61 project upwardly from the base plate top surface 60 and are laterally spaced apart a distance which corresponds to the curved and/or straight transverse dimension of the spring member. The inner walls 62 of the side bars 61 are preferably disposed normal to the base plate top surface 60 for reasons which will become obvious hereinafter while the configuration of these side bars when viewed in plan, may be curved or otherwise shaped according to the desired profile of the finished product. Additionally, the height of these two bars is such that the cavity 63 formed therebetween is of a greater height than the thickness of the spring member. The ends 64 of each side bar will be seen to be disposed short of the end 65 of the base plate 59 while a separate end section 66 of each side bar projects upwardly from the base plate adjacent its end 65.

With the above arrangement, each end section 66 is longitudinally aligned with an opposed end 64 of one side bar 61 but is substantially spaced therefrom with its rear face 67 opposed one end 64 of a side bar. A transverse groove 68 is cut in the top surface 60 of the base plate 59 and axially extends only the width of the cavity 63 as defined by the inner faces 62 of the two spaced side bars. From each end 69 of the groove 68 an enlarged counter-groove 70 extends all the way through the respective side edges 71 of the base plate 59. The center axis of the radius defining the two outboard enlarged grooves 70 and the intermediate smaller groove 68 are co-axial and the function of these grooves will be described hereinafter.

The cooperating upper or male mold section 57 includes a top plate 72 having an undersurface 73 from which depends a longitudinally extending center bar 74. The two opposite lateral surfaces 75—75 of this center bar are configured in a manner congruent with the configuration of the two inner surfaces 62 of the lower male mold section side bars 61 and will likewise be understood to be disposed normal to the top plate undersurface 73 such that when the bottom or mold surface 76 of the center bar is lowered into the cavity 63 an extremely close sliding fit occurs between these cooperating normal surfaces. Each end 77 of the center bar 74 stops short of the end 64 of the lower mold section side bars 61 and abuts the rear face 78 of a center bar end section 79. As shown most clearly in FIGS. 14 and 16, this center bar end section 79 spans the reduced diameter groove 68 in the lowermost base plate section 59 and its two lateral surfaces 80—80 provide a continuation of the center bar lateral surfaces 75 and respectively slide against the lower mold section side bar inner surfaces 62 and side bar end section inner faces 81.

Although FIGS. 14-18 disclose only so much of the mold structure as it appears at one end of a mold apparatus, it will be understood that the opposite end thereof is constructed in a similar manner. The various bar members and end sections thereof are preferably secured to their respective base plate 59 and top plate 72 by means of machine screws as illustrated although quite obviously they may be welded or alternatively comprise integral machined portions of the respective plates.

As shown, the side edges 71 of the base plate 59 and side edges 71' of the top plate 72 laterally project a substantial distance from the vertical plane of the two side bars 61. This provides several advantages including offering a substantially planar expanse to facilitate the rigid fixation of the two mold sections to associated platens of the molding press (not shown). Additionally, this allows room for the disposition of a plurality of stops 82 on either or both the base plate top surface 60 or the top plate undersurface 73, which stops as will be seen in FIG. 16 of the drawings, control the vertical closing distance of the mold sections and thus insure maintenance of a properly vertically dimensioned mold cavity 63 during the formation of the spring member. In view of the disposition of the center bar mold surface 76 between the confines of the side bar inner surfaces 62 well before the mold sections are fully closed, lateral alignment between the two mold sections is easily maintained during the final closing of these mold sections. On the other hand, means should be included to preclude axial or longitudinal mis-alignment between the components of the upper and lower mold sections during the final stages of the closing thereof and accordingly, an end alignment member 82' is appropriately attached to either the end 65' of the top plate 72 or the end 65 of the base plate 59. As will be seen most clearly in FIG. 16 of the drawings, when the two mold sections are fully closed, the alignment member 82 attached to the top plate 72 closely overlies the end 65 of the base plate 59 and with similar alignment member 82' carried by the opposite end of the mold assembly, it will follow that unwanted longitudinal shifting between the mold sections during their closing is prevented.

The referenced center bar end section 79 carried by the upper mold section top plate 72 includes a rearward mold surface 83 which is substantially a continuation of the center bar mold surface 76. This mold surface 83 continues longitudinally outwardly to a transverse groove 84, the axis of which is vertically disposed parallel to the axis of the reduced dimension transverse groove 68 provided in the lower mold section base plate 59. The end wall 85 of the center bar end section 79 is preferably disposed in the same vertical plane as the ends 65 and 65' of the two mold section plates. The outermost bottom surface 86 of the center bar end section 79 will be seen in FIGS. 14 and 17 to be disposed in a plane substantially lower than that of the mold surface 83. In the fully closed condition of the mold components as depicted in FIG. 14, this outer bottom surface 86 of the center bar end section 79 will be seen to be disposed slightly spaced above the top surface 60 of the base plate 59 such that a small laminar passage 87 is formed therebetween. It is through this passage that excess resin squeezed from the molded fiber reinforced plastics body 49 during the closing of the mold sections is ejected.

FIG. 15 of the drawings illustrates a manner of preventing the discharge of resin from the area of the end provisions during the molding operation and wherein the end provision is formed by means of the rod or tube 87' about which the resin-impregnated strands will be understood to have been wound with end portions 50 thereof passing around the outer portion of this tube. For purposes of clarity, the resin-impregnated strands have been omitted in this figure yet it will be understood thst in the fully closed condition of this view, the strands have been compressed to completely fill the space between this rod and the opposed partial grooves 68 and 84. The resin is confined at the vertical planes through this tube and which are aligned with the lateral surfaces 80—80 of the center bar end section 79, by means of two pairs of split blocks 88—88 the radius of which conforms to the radius of the enlarged counter groove 70. With this arrangement, following the curing of the molded product, the two mold sections 57 and 58 are separated and the cured spring member may be lifted from between the side bars 61 of the lower mold section and the split blocks 88 removed.

Figure 19:
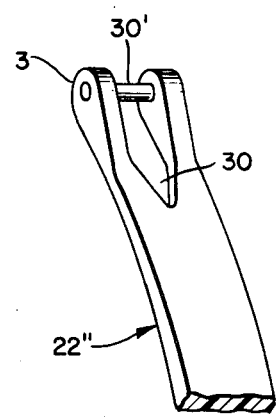
FIG. 19 is a view similar to FIG. 8 and illustrates a spring member according to the present invention.

The frame or rack 46 is then split apart to separate its components from the produced spring member. This action involves removing the side members 47—47 and any cooperating elements such as the retaining means 51 or 53. The resulting spring member will be formed of continuously wound resin-impregnated reinforcing strands having integral end provisions encircled or bounded by substantially continuous, uncut strands which may be immediately provided with associated attachment means such as pivotal links in the case of industrial or vehicle springs or in the case of archery bows may be provided with a central longitudinal cutout 30 for the mounting of a wheel or pulley upon an axle inserted through each end provision as shown in FIG. 19.

The exact disposition of the grooves 69 and 84 will of course, vary depending upon the configuration of the particular spring end provisions. Thus, it will follow that respective ones of these grooves may be enlarged or eliminated depending upon whether the axis of the desired end provisions are above, below or along the neutral axis of the spring main body.

No specific resin compound has been defined for use with this invention as any one of numerous readily available compositions may be utilized as will be apparent to those skilled in this art. Themosetting resinous compositions are most preferred but, should not be considered to be limited thereto.

Throughout this description, the end provisions have been referred to as being bounded by continuous or substantially continuous resin impregnated strands. This language will be understood to refer to the strands 34 wound or wrapped about the end provisions according to the present invention as opposed to the prior art arrangement comprising exposed strand ends or severed strand ends at the spring ends and, of course, does not preclude incorporating the additional or supplemental fabric layers 54 which quite obviously may include severed or non-continuous strands.

I claim:

1. An elongated spring member formed of strands comprising resin impregnated reinforcing fibers including, a medial portion bounded by opposite terminal portions having distal tips, said medial and terminal portions defining a unitary spring member, an end provision adjacent each of said tips, said end provision each including a transverse bore adjacent said terminal portion tips completely encircled by said strands, said strands disposed substantially parallel to one another and extending longitudinally of said member medial and terminal portions, with the exception of said end provision bores said spring member comprising a solid mass of said strands, said medial portion comprising areas having a greater thickness and lesser width relative said terminal portions with a constant cross-sectional area of said mass of strands throughout the longitudinal extent of said medial portion and at least a substantial extent of said terminal portions, and said strands extending in a continuous uninterrupted manner from one said terminal portion tip through said medial portion then encircling said end provision bore at the other said terminal portion tip and returning through said medial portion to encircle said bore of said one terminal portion tip.

2. An elongated spring member according to claim 1 wherein, said end provision includes an elongated element through said transverse bore.

3. An elongated spring member according to claim 1 wherein, said spring member in an at-rest condition is bowed between said distal tips.

4. An elongated spring member according to claim 1 wherein, the longitudinal axis of said end provision is disposed substantially along the neutral axis of said spring member.

5. An elongated spring member according to claim 1 wherein, the longitudinal axis of said end provision is disposed above the neutral axis of said spring member.

6. An elongated spring member according to claim 1 wherein, the longitudinal axis of said end provision is disposed below the neutral axis of said spring member.

7. An elongated spring member according to claim 1 wherein, said member tip includes a vertical cut-out portion therethrough.

8. An elongated spring member according to claim 1 including, a fiber layer substantially surrounding said bore and beneath said strands.

9. An elongated spring member according to claim 2 wherein, said end provision elongated element comprises a sleeve.

* * * * *